US009930637B2

United States Patent
Sebire et al.

(10) Patent No.: US 9,930,637 B2
(45) Date of Patent: Mar. 27, 2018

(54) EVOLVED PACKET CORE (EPC) PAGING FOR ACCESS POINTS

(71) Applicant: NOKIA SOLUTIONS AND NETWORKS OY, Espoo (FI)

(72) Inventors: Benoist Pierre Sebire, Tokyo (JP); Devaki Chandramouli, Plano, TX (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 15/087,009

(22) Filed: Mar. 31, 2016

(65) Prior Publication Data

US 2016/0295549 A1 Oct. 6, 2016

Related U.S. Application Data

(60) Provisional application No. 62/141,562, filed on Apr. 1, 2015.

(51) Int. Cl.
*H04W 68/00* (2009.01)
*H04W 68/02* (2009.01)
(Continued)

(52) U.S. Cl.
CPC ....... *H04W 68/02* (2013.01); *H04W 74/0833* (2013.01); *H04W 76/046* (2013.01);
(Continued)

(58) Field of Classification Search
CPC ............ H04W 68/02; H04W 74/0833; H04W 76/046; H04W 8/22; H04W 88/02;
(Continued)

(56) References Cited

U.S. PATENT DOCUMENTS 7,693,543 B2 * 4/2010 Schwarz ............... H04W 28/18
  455/450
8,159,971 B2 * 4/2012 Singh .................. H04L 41/0853
  370/254

(Continued)

FOREIGN PATENT DOCUMENTS

EP          1997344 A1 * 12/2008 ............. H04W 8/24

OTHER PUBLICATIONS

Ericsson: "Paging enhancements for Low Complexity UE", 3GPP Draft; 36413_CR1255R1 (REL-12)_R3-142111, vol. RAN WG3, No. Dresden, Germany; Sep. 2014 (Sep. 4, 2014), XP050783821, Retrieved from the Internet: URL:http://www.3gpp.org/ftp/Meetings_3GPP SYNC/RAN/Docs/ [retrieved on Sep. 4, 2014] Section 8.9.

(Continued)

*Primary Examiner* — Mahendra Patel
(74) *Attorney, Agent, or Firm* — Squire Patton Boggs (US) LLP

(57) ABSTRACT

Systems, methods, apparatuses, and computer program products of EPC paging for access points are provided. One method includes receiving, by a mobility management entity (MME), wireless local area network (WLAN) capability information of a user equipment (UE), including the WLAN capability information of the UE in a "UE radio capability information for paging" information element (IE), and providing the UE radio capability information to an evolved node B (eNB). The eNB decides, based on the received WLAN capability information, whether to page the UE via E-UTRAN or to notify the UE via WLAN.

7 Claims, 5 Drawing Sheets

(51) Int. Cl.
*H04W 74/08* (2009.01)
*H04W 76/04* (2009.01)
*H04W 84/12* (2009.01)
*H04W 88/02* (2009.01)
*H04W 88/08* (2009.01)
*H04W 88/06* (2009.01)
*H04W 8/22* (2009.01)

(52) U.S. Cl.
CPC ............... *H04W 8/22* (2013.01); *H04W 84/12* (2013.01); *H04W 88/02* (2013.01); *H04W 88/06* (2013.01); *H04W 88/08* (2013.01)

(58) Field of Classification Search
CPC ..... H04W 88/06; H04W 24/10; H04W 72/12; H04W 72/14; H04W 72/0446; H04W 88/08; H04W 74/00; H04W 28/18; H04W 4/00; H04W 84/12; H04W 48/16; H04W 68/12; H04L 12/64; H04L 7/0041; H04L 7/0337; H04L 7/0037; H04L 5/14; H04L 5/1438; H04L 5/1469; H04L 43/0847; H04L 12/5692; H04B 7/2656
USPC ............... 455/458; 370/328, 395.2; 726/6, 1
See application file for complete search history.

(56) References Cited

U.S. PATENT DOCUMENTS

| | | | | |
|---|---|---|---|---|
| 2003/0162553 A1* | 8/2003 | Huang | H04W 68/04 | 455/458 |
| 2006/0126582 A1* | 6/2006 | Saifullah | H04L 12/5692 | 370/338 |
| 2008/0259912 A1* | 10/2008 | Wang | H04W 68/12 | 370/356 |
| 2008/0305825 A1* | 12/2008 | Shaheen | H04W 8/24 | 455/552.1 |
| 2009/0023448 A1* | 1/2009 | Attar | H04W 36/0061 | 455/436 |
| 2010/0037284 A1* | 2/2010 | Sachs | H04L 43/0847 | 726/1 |
| 2010/0067433 A1 | 3/2010 | Cheng et al. | | |
| 2010/0178941 A1* | 7/2010 | Chun | H04L 1/1832 | 455/458 |
| 2011/0222523 A1* | 9/2011 | Fu | H04W 36/22 | 370/338 |
| 2014/0066054 A1* | 3/2014 | Jung | H04W 36/14 | 455/426.1 |
| 2014/0094166 A1 | 4/2014 | Purkayastha et al. | | |
| 2014/0378172 A1* | 12/2014 | Lim | H04W 68/12 | 455/458 |
| 2015/0031382 A1* | 1/2015 | Damnjanovic | H04W 52/0216 | 455/452.1 |
| 2015/0078329 A1* | 3/2015 | Zhu | H04L 5/0005 | 370/330 |
| 2015/0117357 A1* | 4/2015 | Ozturk | H04W 28/0205 | 370/329 |
| 2016/0057729 A1* | 2/2016 | Horn | H04W 48/18 | 455/458 |
| 2016/0112921 A1* | 4/2016 | Nagasaka | H04W 36/22 | 370/331 |
| 2017/0026960 A1* | 1/2017 | Mestanov | H04W 72/0426 | |

OTHER PUBLICATIONS

SA2: "LS on Paging Optimization", 3GPP Draft; R3-150345_S2-150698, vol. RAN WG3, No. Athens, Greece; Feb. 9, 2015-Feb. 13, 2015 Feb. 8, 2015 (Feb. 8, 2015), XP050937447, Retrieved from the Internet: URL:http://www.3gpp.org/ftp/Meetings_3GPPSYNC/RAN3/LSin/ [retrieved on Feb. 8, 2015] pp. 1,2.
S2-150698; 3GPP TSG SA WG2 Meeting #107; Sorrento, Italy, Jan. 26-30, 2015, LS on Paging Optimization.
International Search Report and Written Opinion application No. PCT/EP2016/056596 dated May 3, 2016.

* cited by examiner

| Type | Length | OUI | Data |
|------|--------|-----|------|
| ←1→ | ←1→ | ←3→ | ←1-252→ |

EVOLVED PACKET CORE (EPC) PAGING FOR ACCESS POINTS

CROSS REFERENCE TO RELATED APPLICATIONS

This application is related to and claims the benefit and priority of U.S. Provisional Application No. 62/141,562 filed Apr. 1, 2015, the entirety of which is incorporated herein by reference.

BACKGROUND

Field

Embodiments of the invention generally relate to mobile communications networks, such as, but not limited to, Long Term Evolution (LTE) or LTE-Advanced (LTE-A) (or future 5G radio access technology), which are made up of interconnected Radio Access Networks (RAN), Transport networks (backhaul and backbone networks) and Evolved Packet Core (EPC).

Description of the Related Art

Universal Mobile Telecommunications System (UMTS) Terrestrial Radio Access Network (UTRAN) refers to a communications network including base stations, or Node Bs, and for example radio network controllers (RNC). UTRAN allows for connectivity between the user equipment (UE) and the core network. The RNC provides control functionalities for one or more Node Bs. The RNC and its corresponding Node Bs are called the Radio Network Subsystem (RNS). In case of E-UTRAN (enhanced UTRAN), no RNC exists and most of the RNC functionalities are contained in the evolved Node B (eNodeB or eNB).

Long Term Evolution (LTE) or E-UTRAN refers to improvements of the UMTS through improved efficiency and services, lower costs, and use of new spectrum opportunities. In particular, LTE is a 3GPP standard that provides for uplink peak rates of at least, for example, 75 megabits per second (Mbps) per carrier and downlink peak rates of at least, for example, 300 Mbps per carrier. LTE supports scalable carrier bandwidths from 20 MHz down to 1.4 MHz and supports both Frequency Division Duplexing (FDD) and Time Division Duplexing (TDD).

As mentioned above, LTE may also improve spectral efficiency in networks, allowing carriers to provide more data and voice services over a given bandwidth. Therefore, LTE is designed to fulfill the needs for high-speed data and multimedia transport in addition to high-capacity voice support. Advantages of LTE include, for example, high throughput, low latency, FDD and TDD support in the same platform, an improved end-user experience, and a simple architecture resulting in low operating costs.

Further releases of 3GPP LTE (e.g., LTE Rel-11, LTE Rel-12, LTE Rel-13) are targeted towards future international mobile telecommunications advanced (IMT-A) systems, referred to herein for convenience simply as LTE-Advanced (LTE-A).

LTE-A is directed toward extending and optimizing the 3GPP LTE radio access technologies. A goal of LTE-A is to provide significantly enhanced services by means of higher data rates and lower latency with reduced cost. LTE-A provides a more optimized radio system fulfilling the international telecommunication union-radio (ITU-R) requirements for IMT-Advanced while keeping the backward compatibility.

SUMMARY

One embodiment is directed to a method, which may include receiving, by an evolved node B (eNB), wireless local area network (WLAN) capability information of a user equipment (UE). The WLAN capability information is received as part of a "UE radio capability information for paging" information element (IE). The method may then include, based on the received WLAN capability information, deciding whether to page the UE via E-UTRAN or to notify the UE via WLAN.

Another embodiment is directed to an apparatus including at least one processor and at least one memory comprising computer program code. The at least one memory and the computer program code are configured, with the at least one processor, to cause the apparatus at least to receive wireless local area network (WLAN) capability information of a user equipment (UE). The WLAN capability information is received as part of a "UE radio capability information for paging" information element (IE). The at least one memory and the computer program code are configured, with the at least one processor, to cause the apparatus at least to, based on the received WLAN capability information, decide whether to page the UE via E-UTRAN or to notify the UE via WLAN.

Another embodiment is directed to a method, which may include receiving, by a mobility management entity (MME), wireless local area network (WLAN) capability information of a user equipment (UE). The method may also include including the WLAN capability information of the UE in a "UE radio capability information for paging" information element (IE), and providing the UE radio capability information to an evolved node B (eNB).

Another embodiment is directed to an apparatus including at least one processor and at least one memory comprising computer program code. The at least one memory and the computer program code are configured, with the at least one processor, to cause the apparatus at least to receive wireless local area network (WLAN) capability information of a user equipment (UE), include the WLAN capability information of the UE in a "UE radio capability information for paging" information element (IE), and provide the UE radio capability information to an evolved node B (eNB).

Another embodiment is directed to a method, which may include sending, by a user equipment (UE), wireless local area network (WLAN) capability information to a network node for using the WLAN capability information to decide whether to notify the UE about cellular paging via WLAN.

Another embodiment is directed to an apparatus including at least one processor and at least one memory comprising computer program code. The at least one memory and the computer program code are configured, with the at least one processor, to cause the apparatus at least to send wireless local area network (WLAN) capability information to a network node for using the WLAN capability information to decide whether to notify the apparatus about cellular paging via WLAN.

Another embodiment is directed to a method, which may include receiving, by the user equipment, a notification about cellular paging from a WLAN access point, and establishing a radio resource control connection (RRC) in long term evolution (LTE) by initiating a service request triggering a random access procedure.

Another embodiment is directed to an apparatus including at least one processor and at least one memory comprising computer program code. The at least one memory and the computer program code are configured, with the at least one processor, to cause the apparatus at least to receive a notification about cellular paging from a WLAN access point, and establish a radio resource control connection (RRC) in long term evolution (LTE) by initiating a service request triggering a random access procedure.

BRIEF DESCRIPTION OF THE DRAWINGS

For proper understanding of the invention, reference should be made to the accompanying drawings, wherein:

FIG. 2 illustrates an example structure of an information element (IE);

DETAILED DESCRIPTION

It will be readily understood that the components of the invention, as generally described and illustrated in the figures herein, may be arranged and designed in a wide variety of different configurations. Thus, the following detailed description of embodiments of systems, methods, apparatuses, and computer program products of EPC paging for access points, as represented in the attached figures, is not intended to limit the scope of the invention, but is merely representative of some selected embodiments of the invention.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Additionally, if desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

Figure 1:
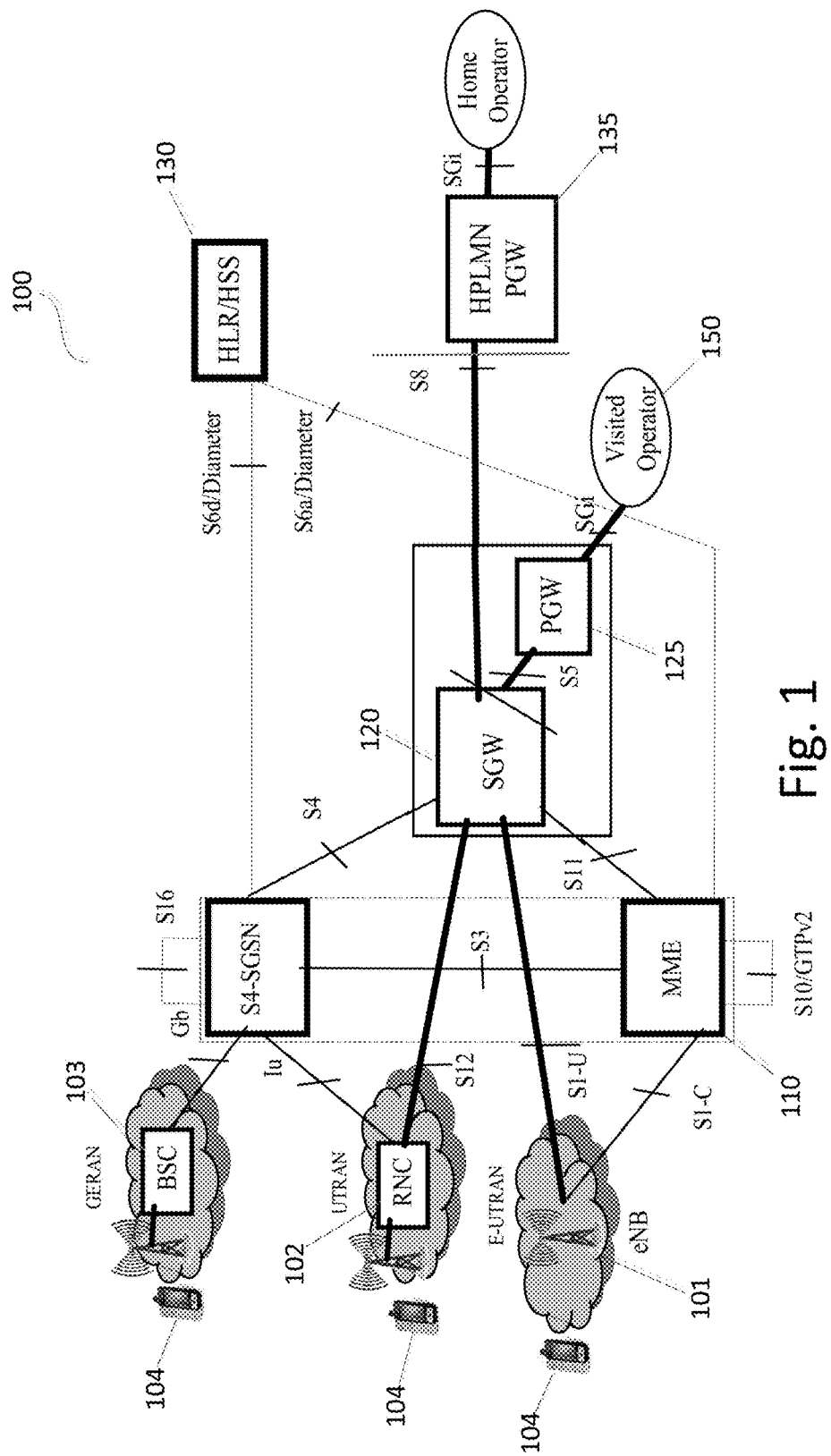
FIG. 1 illustrates a network according to one embodiment.

The evolved packet system (EPS) is the evolution of the general packet radio system (GPRS). EPS provides a new radio interface and new evolved packet core (EPC) network functions for broadband wireless data access. FIG. 1 illustrates an example of the EPS core network 100, according to one example. As illustrated in FIG. 1, the EPS core network 100 may include the Mobility Management Entity (MME) 110, Packet Data Network Gateway (PGW) 125, and Serving Gateway (SGW) 120. MME 110 may be connected to SGW 120 via the S1 interface, and the SGW 120 in turn is connected to PGW 125 via the S5 interface, for example.

A common packet domain core network, such as EPS core network 100, can be used to provide core network functionality to the base station controller (BSC) 103 of the GSM/Edge radio access network (GERAN), the radio network controller (RNC) 102 of the UTRAN, and/or the eNodeB (eNB) 101 of the E-UTRAN.

MME 110 may be considered the main control node for the core network 100. Some features handled by MME 110 may include: bearer activation/de-activation, idle mode UE tracking, choice of SGW for a UE 104, intra-LTE handover involving core network node location, interacting with the home location register (HLR)/home subscriber server (HSS) 130 to authenticate user on attachment, and providing temporary identities for UEs 104.

HLR/HSS 130 is a central database that contains user-related and subscription-related information, for example. Functions of the HLR/HSS 130 may be related to mobility management, call and session establishment support, user authentication and access authorization.

SGW 120 is a data plane element within the core network 100. SGW 120 may manage user plane (UP) mobility, act as a local mobility anchor and provide an UP interface to the radio access network(s). SGW 120 may maintain the data path between the eNBs 101 and PGW 125. SGW 120 may also be in communication with home public land mobile network (HPLMN) PGW 135. PGW 125 may provide connectivity for the UE to external packet data networks (PDNs). A UE 104 may have connectivity with more than one PGW 125 for accessing multiple PDNs 150.

In cellular networks, the proliferation of machine type communication (MTC) devices and smart phones with services requiring notifications considerably increases the paging load. Paging optimizations are being debated in 3GPP. For instance, 3GPP S2-150698 states: "SA2 has the understanding that one approach to reduce the radio interface paging load is to page the UE only via cells that operate in frequency bands supported by the UE. SA2 believes that information about frequency bands supported by the UE can be added to the "UE Radio Capability for Paging" IE that is provided to the MME in order to be stored and then relayed to eNBs in the S1 paging message."

When the UE is connected to a wireless local area network (WLAN) access point (AP) but idle in LTE, paging over LTE could be avoided. An example use case may be something to the effect of: a smart phone is connected to a WLAN AP but is simultaneously idle in LTE. With smart phones, this kind of use case is very much possible these days.

According to an embodiment of the invention, the WLAN capability information may be used by the network to decide whether the UE is notified over WLAN APs and/or paged via E-UTRAN. In some embodiments, the WLAP APs may be co-located. The WLAN capability information may include, for example, one of the following: information indicating that the UE has a WLAN capability, the UE is capable of communicating over WLAN interface, the WLAN capability in the UE has been switched on, the UE has an ongoing connection to a WLAN access point, or that the UE is capable of receiving cellular paging via WLAN notification.

In an embodiment, the above use of the WLAN capability information may be accomplished by the UE providing WLAN capability information to the eNB over Access Stratum (AS) and the eNB providing it to the MME. In an alternative embodiment, the UE may provide the WLAN capability information over Non-Access Stratum (NAS). The MME may relay it to the eNB in the S1 paging message. For example, when the MME needs to page the UE, the MME includes the WLAN capability of the UE as part of an information element, for example the "UE radio capability information for paging" information element (IE). However, the information element is not limited to this specific information element, but any other suitable IE may be used. The eNB may also receive the WLAN capability of the UE directly from the UE, for example in an RRC message. In this case, an information element including the WLAN capability information, such as the "UE radio capability information for paging" IE, may be included in the message received from the UE. Based on this WLAN capability information, the eNB may decide whether to page the UE via E-UTRAN or notify the UE via WLAN.

Irrespective of how the UE is reached (i.e., either notified via WLAN or paged via E-UTRAN by the eNB), the UE may respond with a service request so it is agnostic to the MME, i.e., the MME may expect to receive a service request in either case.

According to an embodiment, from the perspective of the MME, the WLAN capability of the UE is added to an IE, such as the "UE radio capability for paging" IE, that is provided to the MME in order to be stored and then relayed to eNBs in the S1 paging message.

In an embodiment, from the perspective of the eNB, when receiving a paging message from the MME, the eNB tries to notify the corresponding UE over the co-located WLAN AP or APs. This can be done in parallel to paging over LTE. For instance, it may be done in parallel to paging over LTE if speed is the primary criteria for delivering the mobile terminated transaction.

According to an embodiment, from the perspective of the UE, upon being notified by the WLAN AP by this method, the UE establishes a radio resource control (RRC) connection in LTE by initiating a service request triggering a random access procedure. So, this kind of notification is transparent to the MME. This could be controlled by the notification with a special indication over WLAN.

Figure 2:
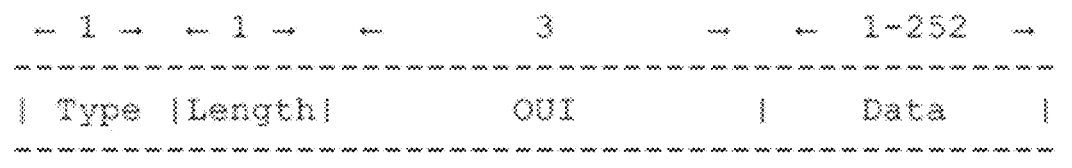

The Wi-Fi AP may send a management frame to the wireless network interface card (WNIC) and this is used to allow communication. This management frame may also include an information element (IE). The information element can include information used to notify the UE about the paging. FIG. 2 illustrates an example structure of an IE, where OUI refers to an organizationally unique identifier.

According to an embodiment, a special management frame may be introduced to notify the UE via a Wi-Fi AP, and the receiving UE may use this as an indication to decide the next course of action. For example, the bit (i.e., special management frame) may be used to indicate that the UE should respond to the cellular network, e.g., with service request as it normally does for LTE paging. The cellular network/eNB could also use other parameters such as trusted Wi-Fi access, radio conditions or radio coverage information, paging load information etc. to determine how paging should be performed (i.e., either directly via LTE Uu interface or indirectly via Wi-Fi Access Point).

According to certain embodiments, it is not necessary to carry an LTE paging message via Wi-Fi AP (access point). Rather, embodiments enhance the existing communication methods from the Wi-Fi AP to the UE in order to send a notification that is triggered by cellular paging. For example, the Wi-Fi AP may send a beacon signal and other management frames to the UE as a notification for paging triggered by cellular network. This is to allow maintenance of the communication. Thus, it is possible to extend the existing communication methods over WLAN interface to carry notification for paging triggered by cellular network.

The cellular network or eNB may decide when to perform this notification via the Wi-Fi network (i.e., it is not just left to the UE to determine as the UE may not be able to reliably differentiate a trusted WLAN network from an untrusted WLAN network). This is a reason why certain embodiments use the collocated WLAN AP scenario for such notification. Thus, it is ensured that the notification happens via a trusted Wi-Fi AP and not from a random, untrusted Wi-Fi network or any/some fake WLAN AP which may cause a security threat to the UE.

In addition, certain embodiments are able to provide a solution to the problem related to offloading user traffic to WLAN, namely how to get the UE connected back to LTE when required. This will currently require paging of the UE to get it into CONNECTED mode, which embodiments of the invention substitute by direct signaling on WLAN.

Figure 3A:
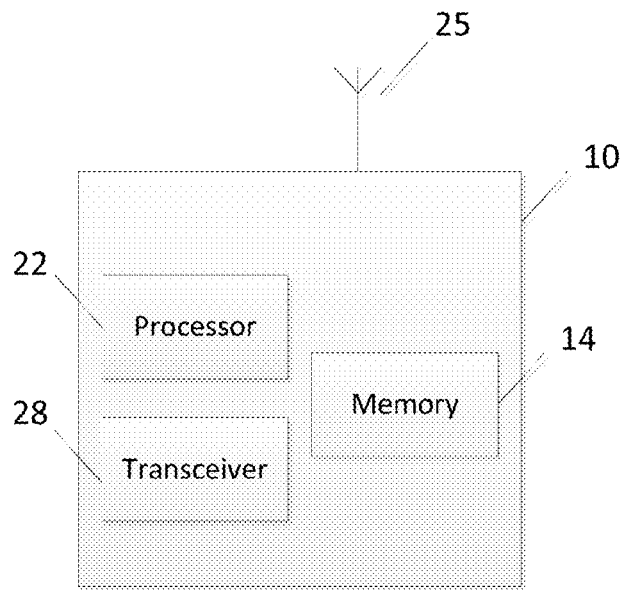
FIG. 3a illustrates a block diagram of an apparatus according to an embodiment.

FIG. 3a illustrates an example of an apparatus 10 according to an embodiment. In an embodiment, apparatus 10 may be a node, host, or server in a communications network or serving such a network. For example, in certain embodiments, apparatus 10 may be a network node or access node for a radio access network, such as a base station in UMTS or eNB in LTE or LTE-A. In other embodiments, apparatus 10 may be a control node in or serving a communications network, such as a MME. However, in further embodiments, apparatus 10 may be other components within a radio access network. It should be noted that one of ordinary skill in the art would understand that apparatus 10 may include components or features not shown in FIG. 3a.

As illustrated in FIG. 3a, apparatus 10 includes a processor 22 for processing information and executing instructions or operations. Processor 22 may be any type of general or specific purpose processor. While a single processor 22 is shown in FIG. 3a, multiple processors may be utilized according to other embodiments. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 may further include or be coupled to a memory 14 (internal or external), which may be coupled to processor 22, for storing information and instructions that may be executed by processor 22. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory (RAM), read only memory (ROM), static storage such as a magnetic or optical disk, or any other type of non-transitory machine or computer readable media. The instructions stored in memory 14 may include program instructions or computer program code that, when executed by processor 22, enable the apparatus 10 to perform tasks as described herein.

In some embodiments, apparatus 10 may also include or be coupled to one or more antennas 25 for transmitting and receiving signals and/or data to and from apparatus 10. Apparatus 10 may further include or be coupled to a transceiver 28 configured to transmit and receive information. For instance, transceiver 28 may be configured to modulate information on to a carrier waveform for transmission by the antenna(s) 25 and demodulate information received via the antenna(s) 25 for further processing by other elements of apparatus 10. In other embodiments, transceiver 28 may be capable of transmitting and receiving signals or data directly.

Processor 22 may perform functions associated with the operation of apparatus 10 which may include, for example, precoding of antenna gain/phase parameters, encoding and decoding of individual bits forming a communication message, formatting of information, and overall control of the apparatus 10, including processes related to management of communication resources.

In an embodiment, memory 14 may store software modules that provide functionality when executed by processor 22. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

In one embodiment, apparatus 10 may be a network node or access node, such as a base station in UMTS or an eNB in LTE or LTE-A, for example. In this embodiment, apparatus 10 may be controlled by memory 14 and processor 22 to receive WLAN capability information of a UE. The WLAN capability information may be received as part of a UE radio capability information for paging information element (IE). In an embodiment, the WLAN capability information may be received from a MME in an S1 paging message. Apparatus 10 may then be controlled by memory 14 and processor 22 to decide, based on the received WLAN capability information, whether to page the UE via E-UTRAN or to notify the UE via WLAN.

In another embodiment, apparatus 10 may be a control node, such as a MME. In this embodiment, apparatus 10 may be controlled by memory 14 and processor 22 to receive WLAN capability information of a UE, to include the WLAN capability information of the UE in a "UE radio capability information for paging"-information element (IE), and to provide the UE radio capability information to an eNB. In an embodiment, apparatus 10 may be controlled by memory 14 and processor 22 to provide the UE radio capability information to the eNB in an S1 paging message.

Figure 3B:
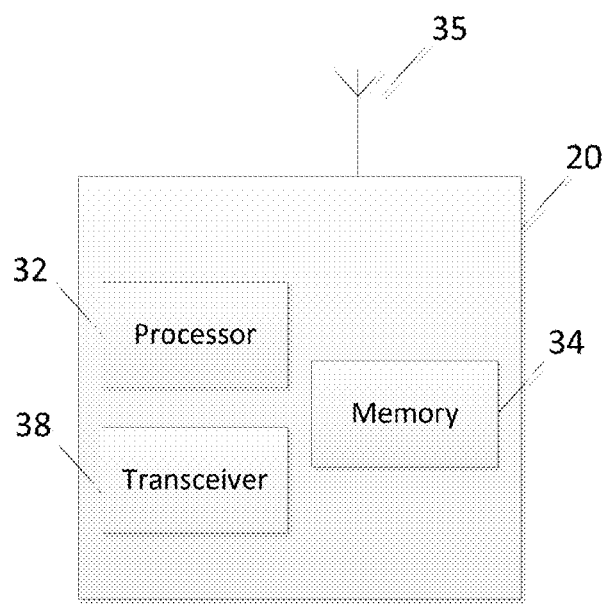
FIG. 3b illustrates a block diagram of an apparatus according to another embodiment.

FIG. 3*b* illustrates an example of an apparatus 20 according to another embodiment. In an embodiment, apparatus 20 may be a node or element in a communications network or associated with such a network, such as a UE, mobile device, mobile unit, a machine type UE or other device. For instance, in some embodiments, apparatus 20 may be UE in LTE or LTE-A. It should be noted that one of ordinary skill in the art would understand that apparatus 20 may include components or features not shown in FIG. 3*b*.

As illustrated in FIG. 3*b*, apparatus 20 includes a processor 32 for processing information and executing instructions or operations. Processor 32 may be any type of general or specific purpose processor. While a single processor 32 is shown in FIG. 3*b*, multiple processors may be utilized according to other embodiments. In fact, processor 32 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 20 may further include or be coupled to a memory 34 (internal or external), which may be coupled to processor 32, for storing information and instructions that may be executed by processor 32. Memory 34 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 34 can be comprised of any combination of random access memory (RAM), read only memory (ROM), static storage such as a magnetic or optical disk, or any other type of non-transitory machine or computer readable media. The instructions stored in memory 34 may include program instructions or computer program code that, when executed by processor 32, enable the apparatus 20 to perform tasks as described herein.

In some embodiments, apparatus 20 may also include or be coupled to one or more antennas 35 for transmitting and receiving signals and/or data to and from apparatus 20. Apparatus 20 may further include a transceiver 38 configured to transmit and receive information. For instance, transceiver 38 may be configured to modulate information on to a carrier waveform for transmission by the antenna(s) 35 and demodulate information received via the antenna(s) 35 for further processing by other elements of apparatus 20. In other embodiments, transceiver 38 may be capable of transmitting and receiving signals or data directly.

Processor 32 may perform functions associated with the operation of apparatus 20 including, without limitation, precoding of antenna gain/phase parameters, encoding and decoding of individual bits forming a communication message, formatting of information, and overall control of the apparatus 20, including processes related to management of communication resources.

In an embodiment, memory 34 stores software modules that provide functionality when executed by processor 32. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

As mentioned above, according to one embodiment, apparatus 20 may be a mobile device, such as a UE in LTE or LTE-A. In this embodiment, apparatus 20 may be controlled by memory 34 and processor 32 to send WLAN capability information to a network node, which may use the WLAN capability information to decide whether to notify the apparatus 20 about cellular paging via WLAN.

In another embodiment, apparatus 20 may also be controlled by memory 34 and processor 32 to receive a notification about cellular paging from a WLAN access point. When notified by the WLAN access point, apparatus 20 may then be controlled by memory 34 and processor 32 to establish a radio resource control connection (RRC) in LTE by initiating a service request triggering a random access procedure. In one embodiment, apparatus 20 may be further controlled by memory 34 and processor 32 to send the WLAN capability information over AS or NAS interface.

Figure 4A:
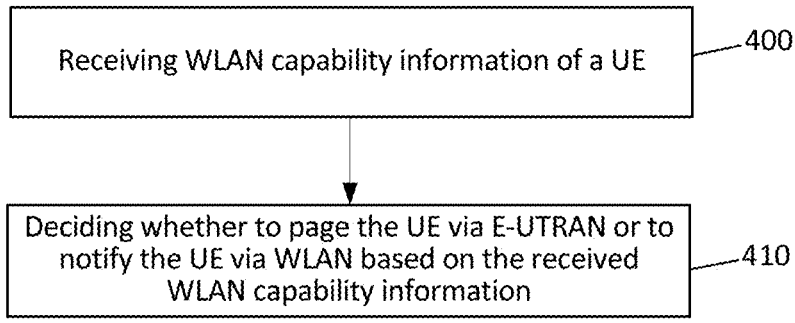
FIG. 4a illustrates a flow diagram of a method according to an embodiment.

FIG. 4*a* illustrates an example flow diagram of a method, according to one embodiment. In certain embodiments, the method of FIG. 4a may be performed by a network node, such as a base station or eNB. The method may include, at 400, receiving WLAN capability information of a UE. The WLAN capability information may be received as part of a "UE radio capability information for paging"-information element (IE). The method may also include, at 410, deciding whether to page the UE via E-UTRAN or to notify the UE via WLAN based on the received WLAN capability information. In one embodiment, the receiving may include receiving the WLAN capability information from a MME in an S1 paging message.

Figure 4B:
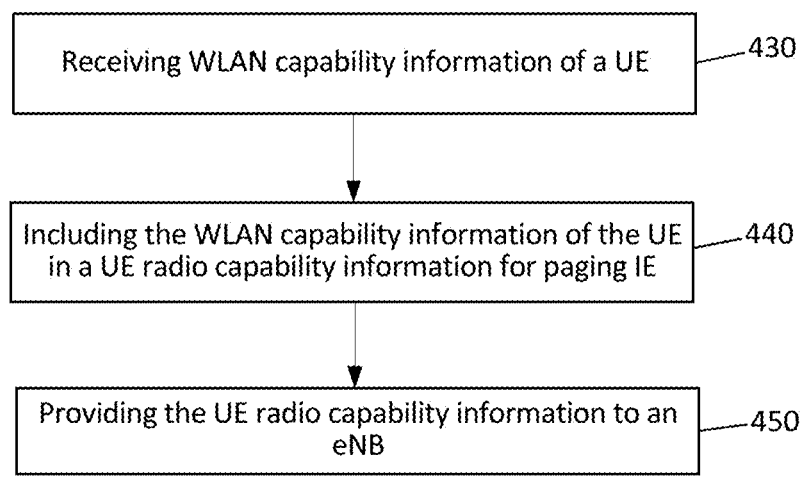
FIG. 4b illustrates a flow diagram of a method according to another embodiment.

FIG. 4b illustrates an example flow diagram of a method, according to one embodiment. In certain embodiments, the method of FIG. 4b may be performed by a control node, such as a MME. The method may include, at 430, receiving WLAN capability information of a UE and, 440, including the WLAN capability information of the UE in a "UE radio capability information for paging" information element (IE). The method may also include, at 450, providing the UE radio capability information to an eNB. In an embodiment, the providing may further include providing the UE radio capability information to the eNB in an S1 paging message.

Figure 4C:
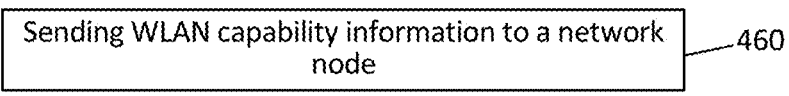
FIG. 4c illustrates a flow diagram of a method according to another embodiment.

FIG. 4c illustrates an example flow diagram of a method, according to one embodiment. In certain embodiments, the method of FIG. 4c may be performed by a mobile device, such as a UE. The method may include, at 460, sending WLAN capability information to a network node, which may use the WLAN capability information to decide whether to notify the UE about cellular paging via WLAN. In an embodiment, the sending may further include sending the WLAN capability information over AS or NAS interface.

Figure 4D:
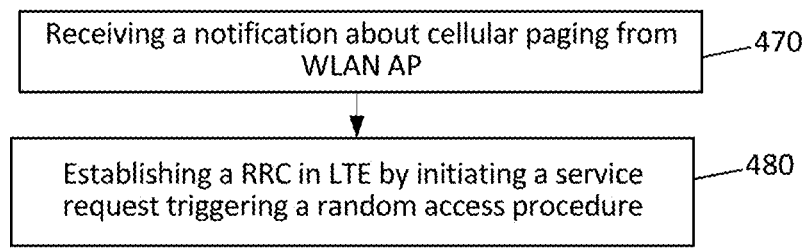
FIG. 4d illustrates a flow diagram of a method according to another embodiment.

FIG. 4d illustrates an example flow diagram of a method, according to an embodiment. In certain embodiments, the method of FIG. 4c may be performed by a mobile device, such as a UE. As illustrated in FIG. 4d, the method may include, at 470, receiving a notification about cellular paging from a WLAN access point. At 480, the method may further include establishing a radio resource control connection (RRC) in LTE by initiating a service request triggering a random access procedure. It should be noted that, in some embodiments, the methods of FIGS. 4c and 4d may be combined.

In another embodiment, an apparatus, such as an eNB, may include a receiving unit or means and a deciding unit or means. The receiving unit may receive WLAN capability information of a UE. The WLAN capability information may be received as part of a "UE radio capability information for paging"-information element (IE). Based on the received WLAN capability information, the deciding unit may decide whether to page the UE via E-UTRAN or to notify the UE via WLAN. In one embodiment, the receiving unit may further include means for receiving the WLAN capability information from a mobility management entity (MME) in an S1 paging message.

According to another embodiment, an apparatus, such as an MME, may include a receiving unit or means, an including unit or means, and a providing unit or means. The receiving unit may receive WLAN capability information of a UE. The including unit may include the WLAN capability information of the UE in a "UE radio capability information for paging" information element (IE), and the providing unit may provide the UE radio capability information to an eNB. The providing unit may further include means for providing the UE radio capability information to the eNB in an S1 paging message.

In yet another embodiment, an apparatus, such as a UE, may include a sending unit or means, a receiving unit or means, and an establishing unit or means. The sending unit may send WLAN capability information to a network node, which may use the WLAN capability information to decide whether to notify the apparatus about cellular paging via WLAN. The receiving unit may receive a notification about cellular paging from a WLAN access point. When notified by a WLAN access point, the establishing unit may establish a RRC in LTE by initiating a service request triggering a random access procedure. In one embodiment, the sending unit may also include means for sending the WLAN capability information over AS or NAS interface.

Embodiments of the invention may provide several advantages and/or technical improvements. For example, instead of trying to page the UE via LTE and therefore wait for the paging occasion to occur, the eNB/collocated AP may directly notify the UE via WLAN. This approach not only reduces paging load in LTE, but may also speed up the procedure.

Programs, also called program products or computer programs, including software routines, applets and macros, may be stored in any apparatus-readable data storage medium and they include program instructions to perform particular tasks. A computer program product may comprise one or more computer-executable components which, when the program is run, are configured to carry out embodiments. The one or more computer-executable components may be at least one software code or portions of it. Modifications and configurations required for implementing functionality of an embodiment may be performed as routine(s), which may be implemented as added or updated software routine(s). Software routine(s) may be downloaded into the apparatus.

Software or a computer program code or portions of it may be in a source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other embodiments, the functionality of any method or apparatus described herein may be performed by hardware, for example through the use of an application specific integrated circuit (ASIC), a programmable gate array (PGA), a field programmable gate array (FPGA), or any other combination of hardware and software. In yet another embodiment, the functionality may be implemented as a signal, a non-tangible means that may be carried by an electromagnetic signal downloaded from the Internet or other network.

According to an embodiment, an apparatus, such as a node, device, or a corresponding component, may be configured as a computer or a microprocessor, such as single-chip computer element, or as a chipset, including at least a memory for providing storage capacity used for arithmetic operation and an operation processor for executing the arithmetic operation.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method, comprising:
    receiving, by an evolved node B (eNB), wireless local area network (WLAN) capability information of a user equipment (UE), wherein the wireless local area network (WLAN) capability information is received as part of a "user equipment (UE) radio capability information for paging" information element (IE), wherein the receiving comprises receiving the wireless local area network (WLAN) capability information from a mobility management entity (MME) in an S1-interface paging message; and
    based on the received wireless local area network (WLAN) capability information, deciding by the evolved node B (eNB), whether to page the user equipment (UE) via evolved universal terrestrial radio access network (E-UTRAN) or to notify the user equipment (UE) via wireless local area network (WLAN) to reduce a paging load of the evolved universal terrestrial radio access network (E-UTRAN).

2. An evolved node B (eNB), comprising:
    at least one processor; and
    at least one memory comprising computer program code,
    the at least one memory and the computer program code are configured, with the at least one processor, to cause the apparatus at least to
    receive wireless local area network (WLAN) capability information of a user equipment (UE) from a mobility management entity (MME) in an S1-interface paging message, wherein the wireless local area network (WLAN) capability information is received as part of a "user equipment (UE) radio capability information for paging" information element (IE); and
    based on the received wireless local area network (WLAN) capability information, decide whether to page the user equipment (UE) via evolved universal terrestrial radio access network (E-UTRAN) or to notify the user equipment (UE) via wireless local area network (WLAN) to reduce a paging load of the evolved universal terrestrial radio access network (E-UTRAN).

3. A method, comprising:
    receiving, by a mobility management entity (MME), wireless local area network (WLAN) capability information of a user equipment (UE);
    including the wireless local area network (WLAN) capability information of the user equipment (UE) in a "user equipment (UE) radio capability information for paging" information element (IE); and
    providing the "user equipment (UE) radio capability information for paging" information element (IE) including the wireless local area network (WLAN) capability information of the user equipment (UE) to an evolved node B (eNB) for using, by the evolved node B (eNB), the wireless local area network (WLAN) capability information of the user equipment (UE) to decide whether to page the user equipment (UE) via evolved universal terrestrial radio access network (E-UTRAN) or to notify the user equipment (UE) via wireless local area network (WLAN) to reduce a paging load of the evolved universal terrestrial radio access network (E-UTRAN),
    wherein the providing further comprises providing the "user equipment (UE) radio capability information for paging" information element (IE) to the evolved node B (eNB) in an S1-interface paging message.

4. An apparatus, comprising:
    at least one processor; and
    at least one memory comprising computer program code,
    the at least one memory and the computer program code are configured, with the at least one processor, to cause the apparatus at least to
    receive wireless local area network (WLAN) capability information of a user equipment (UE);
    include the wireless local area network (WLAN) capability information of the user equipment (UE) in a "user equipment (UE) radio capability information for paging" information element (IE); and
    provide the "user equipment (UE) radio capability information for paging" information element (IE) including the wireless local area network (WLAN) capability information of the user equipment (UE) to an evolved node B (eNB) for using, by the evolved node B (eNB), the wireless local area network (WLAN) capability information of the user equipment (UE) to decide whether to page the user equipment (UE) via evolved universal terrestrial radio access network (E-UTRAN) or to notify the user equipment (UE) via wireless local area network (WLAN) to reduce a paging load of the evolved universal terrestrial radio access network (E-UTRAN),
    wherein the providing further comprises providing the "user equipment (UE) radio capability information for paging" information element (IE) to the evolved node B (eNB) in an S1-interface paging message,
    wherein the apparatus comprises a mobility management entity (MME).

5. A method, comprising:
    sending, by a user equipment (UE), wireless local area network (WLAN) capability information, for using, by an evolved node B (eNB), the wireless local area network (WLAN) capability information to decide whether to page the user equipment (UE) via evolved universal terrestrial radio access network (E-UTRAN) or to notify the user equipment (UE) via wireless local area network (WLAN) to reduce a paging load of the evolved universal terrestrial radio access network (E-UTRAN),
    wherein the sending comprises sending the wireless local area network (WLAN) capability information over access stratum (AS) interface or over non-access stratum (NAS) interface;
    receiving, by the user equipment (UE), a notification about cellular paging from a wireless local area network (WLAN) access point; and
    when the notification about cellular paging is received from the wireless local area network (WLAN) access point, establishing a radio resource control connection (RRC) in the evolved universal terrestrial radio access network (E-UTRAN) by initiating a service request triggering a random access procedure.

6. An apparatus, comprising:
    at least one processor; and
    at least one memory comprising computer program code, the at least one memory and the computer program code are configured, with the at least one processor, to cause the apparatus at least to send wireless local area network (WLAN) capability information, for using, by an evolved node B (eNB), the wireless local area network (WLAN) capability information to decide whether to page the apparatus via evolved universal terrestrial radio access network (E-UTRAN) or to notify the apparatus via wireless local area network (WLAN) to reduce a paging load of the evolved universal terrestrial radio access network (E-UTRAN), wherein the sending comprises sending the wireless local area network (WLAN) capability information over access stratum (AS) interface or non-access stratum (NAS) interface;

receive a notification about cellular paging from a wireless local area network (WLAN) access point; and when the notification about cellular paging is received from the wireless local area network (WLAN) access point, establish a radio resource control connection (RRC) in the evolved universal terrestrial radio access network (E-UTRAN) by initiating a service request triggering a random access procedure.

7. The apparatus according to claim 6, wherein the apparatus comprises a user equipment.

* * * * *